United States Patent Office 3,547,845
Patented Dec. 15, 1970

3,547,845
VINYL ESTER/ETHYLENE COPOLYMER AQUEOUS DISPERSIONS
Paul S. Pinkney, West Chester, Pa., assignor to E. I. du Pont de Nemours and Company, Wilmington, Del., a corporation of Delaware
No Drawing. Continuation-in-part of application Ser. No. 686,324, Nov. 28, 1967. This application July 18, 1969, Ser. No. 843,216
Int. Cl. C08f 27/08, 29/10, 3/62
U.S. Cl. 260—17
10 Claims

ABSTRACT OF THE DISCLOSURE

Aqueous dispersions, having good formulating latitude and especially suitable for use in paint formulations, are disclosed. The dispersions contain an iminated carboxylic polymer, e.g., vinyl acetate/ethylene/acrylic acid, a particular anionic/non-ionic surfactant combination, potassium tripolyphosphate, and a protective colloid, e.g., hydroxyethyl-cellulose.

CROSS REFERENCE TO RELATED APPLICATIONS

This application is a continuation-in-part of pending application Ser. No. 686,324, filed Nov. 28, 1967, now abandoned.

BACKGROUND OF THE INVENTION

Many of the available aqueous paint compositions, comprising pigments combined with polymeric binders, represent the combined efforts of at least two distinct manufacturing entities. Primarily, there is the manufacturer of the basic polymeric binder dispersion. Secondly, there is the paint formulator who takes the binder dispersion and adds pigments and other ingredients to make the final product. In general, for every binder manufacturer, there are many formulators, each of which usually formulates his particular paint in a slightly different manner with respect to pigment types, amounts, and dispersing systems, i.e., pigment grinds, than do the others.

The fact that individual formulators prepare their final products in diverse manners, confronts the binder manufacturer with the problem of ensuring that his binder dispersion has adequate formulating latitude. Adequate formulating latitude permits the manufacturer's basic binder dispersion to be used in any of a wide variety of paint formulations without apprehension that the addition of the particular pigment grind will cause the dispersion to unduly thicken or coagulate.

The problem of obtaining adequate formulating latitude is especially evident with a particular class of aqueous dispersions based on iminated carboxylic vinyl acetate/ethylene copolymers. In view of the remarkable superiority of these dispersions in paint applications, particularly with respect to wet adhesion and crack resistance, many different paint formulators are expected to use them. Accordingly, it would be highly desirable to prepare such dispersions with good formulating latitude.

SUMMARY OF THE INVENTION

According to the present invention there is provided an iminated carboxylic vinyl ester/ethylene copolymer dispersion which has extremely good formulating latitude. The present dispersion comprises, in an aqueous medium, the following ingredients:

(I) an iminated carboxylic vinyl ester/ethylene copolymer having 5–55 percent of the acid groups iminated and containing 80–95 weight percent copolymerized vinyl ester, 1–18 weight percent copolymerized ethylene and, prior to imination, 0.01–1.0 milliequivalent of acid per gram of copolymer;

(II) an anionic/non-ionic surfactant combination of, based on the copolymer weight, 0.5–3.5 percent anionic surfactant (a) and 1–5 percent nonionic surfactant (b), wherein (a) is a di-sodium or di-potassium salt of the half ester of sulfosuccinic acid derived from a $C_{10}$–$C_{12}$ straight chain ethoxylated alcohol mixture and (b) is a $C_7$–$C_{10}$ alkylphenyl polyether alcohol with 8–15 ethylene oxide groups per molecule;

(III) at least 0.2 percent, based on the copolymer weight, of potassium tripolyphosphate; and (IV) at least 0.2 percent, based on the copolymer weight, of a water-soluble protective colloid.

In addition to good formulating latitude, it has been discovered that paints formulated from these dispersions show surprisingly good tint retention and efflorescence resistance while the properties of high wet adhesion and crack resistance are maintained.

DESCRIPTION OF THE INVENTION

The carboxylic vinyl ester/ethylene copolymers useful in the present invention are substantially water-insoluble copolymers containing, prior to imination, pendant carboxyl groups (—COOH) or their salts (e.g., —COOK). These copolymers are copolymerized products of a lower vinyl ester, ethylene and at least one monomer containing both polymerizable olefinic unsaturation and carboxylic acid groups (or an equivalent source of carboxyl groups).

Useful carboxylic copolymers contain about 80 to 95 weight percent copolymerized vinyl ester, and 1 to 18 weight percent copolymerized ethylene, and have 0.01 to 1.0 milliequivalent of acid per gram of polymer. Preferably, such carboxylic copolymers contain 83 to 92 weight percent copolymerized vinyl ester, 7–16 weight percent copolymerized ethylene, and 0.05–0.5 milliequivalent of acid per gram of polymer. Since as hereinafter set forth, a variety of compounds having different molecular weights can be used to provide the carboxylic moiety in the present copolymers, weight percent copolymerized acid cannot be precisely correlated with the above-recited acid milliequivalent range. However, for lower carboxylic acids such as acrylic and methacrylic acids, copolymerized weight percentages of about 0.5–10 and, preferably 0.7–4 weight percent, are useful.

While vinyl acetate is the preferred vinyl ester monomer, other vinyl esters of lower carboxylic acids, such as vinyl formate, vinyl propionate and vinyl butyrate, can also be used. Also, the carboxylic acid monomer can be selected from a wide variety of olefinically unsaturated carboxylic acids. Preferred, however, are acrylic and methacrylic acid. Acrylic acid is particularly preferred since the carboxylic acid copolymer prepared is especially compositionally homogeneous. However, many other unsaturated carboxylic acids are operable. Illustrative of some of these are monocarboxylic acids, such as crotonic acid, and dicarboxylic acids, such as itaconic acid, maleic acid, and fumaric acid. Mixtures of the above acids, as well as the half esters of dicarboxylic acids, such as methylhydrogen maleate can likewise be used. Also, other copolymerized monomers, such as ethyl acrylate, 2-ethylhexyl acrylate, and vinyl versatate can replace a small portion of the copolymerized ethylene content present in the copolymers.

In order to obtain the formulating latitude of the present invention, the dispersion must contain a protective colloid, potassium tripolyphosphate, and a particular anionic/non-ionic surfactant combination. Protective colloids useful in the present invention are water-soluble, non-ionic cellulose derivatives and water-soluble polyvinyl alcohols. As used in the present invention, the term "water-soluble" means that the particular protective colloid is soluble in water at the temperature at which the polymerization reaction is to be accomplished. In particular, methyl cellulose and especially hydroxyethylcellulose have been discovered to be useful as protective colloids in the present invention. These colloids are useful over all of the ordinarily employed polymerization temperature ranges. On the other hand, cellulose derivatives, such as hydroxypropyl cellulose, which is soluble only at lower temperatures, is only useful when the polymerization temperature is of lower magnitude. With cellulose derivative colloids, it is well known that the degree of substitution on the basic cellulose ring influences the water solubility. Accordingly, the degree of substitution for cellulosic colloids useful in the present invention must be such as to render the colloid soluble. For hydroxyethylcellulose, a degree of substitution of about 2.5–3 is preferred. Also, while the viscosity of the cellulose derivative is not especially important in the present invention, it is desirable to use those having a 2 percent water solution Brookfield viscosity (#2 spindle at 60 r.p.m.) no higher than about 500 centipoises at 25° C.

In addition to cellulose derivatives, water-soluble polyvinyl alcohols are also useful, though not preferred, as protective colloids in the present invention. Such polyvinyl alcohols preferably contain enough acetate groups to provide solubility in cold water, although completely hydrolyzed grades may also be used. In general, useful polyvinyl alcohols have a degree of hydrolysis of about 85–100 percent; the balance being vinyl acetate. As with the cellulose derivatives, the viscosity of the polyvinyl alcohol colloid is not especially important though it is preferred to use a polyvinyl alcohol which has a 4 percent water solution Hoeppler falling ball viscosity of no higher than about 45 centipoises at 20° C.

The amount of protective colloid employed in the present dispersions is usually about 0.2–3 weight percent, based on the copolymer weight. While higher concentrations of colloid can be used, the polymer dispersion tends to become excessively viscous and, thus, amounts in excess of about 3 percent are not ordinarily employed. A preferred range is about 0.3–1 percent.

Potassium tripolyphosphate presently useful is a commercially available ingredient which is represented by the molecular formula $K_5P_3O_{10}$. In order to ensure adequate formulating latitude, at least 0.2 percent, based on the copolymer weight, of the tripolyphosphate must be used. While the maximum amount added of this ingredient is not especially important, generally an amount in excess of about 2.5 percent is not employed. Preferably, potassium tripolyphosphate is present in a concentration of about 0.35–1 percent.

Regarding the surfactant ingredients in the present dispersions, about 0.5–3.5 percent anionic surfactant and 1–5 percent non-ionic surfactant, both being based on the copolymer weight, are used. Preferably, the anionic and non-ionic surfactants are present in amounts of 1.5–2.5 percent and 2–4 percent, respectively. Preferred, as the non-ionic surfactant, is a $C_8$–$C_9$ alkylphenyl polyether alcohol having 9–13 ethylene oxide groups per molecule while the sodium salt of the sulfosuccinic acid ester is the preferred anionic surfactant.

Useful techniques of preparing carboxylic vinyl ester/ethylene copolymer dispersions are well known and can be employed in preparing the present dispersions. More particularly, the polymerization is usually carried out in an emulsion, containing the surfactant combination and protective colloid, in a closed vessel under an ethylene pressure sufficient to introduce the desired amount of ethylene into the polymer. In general, pressures on the order of about 150 p.s.i. to about 1,500 p.s.i. are employed; the higher pressures being used when larger amounts of ethylene are to be introduced into the polymer. Both continuous and batch polymerization techniques are known to be useful in preparing carboxylic polymers. In continuous polymerization techniques, polymerization temperatures generally range from about 80° C. up to as high as about 115° C. On the other hand, for batch polymerizations, the temperatures generally range from about 20° C. to about 100° C. and, preferably, between about 60° C. and 90° C. For paint applications, the polymerized dispersions generally contain less than about 0.5 percent unpolymerized vinyl acetate. The potassium tripolyphosphate can be added to the dispersion at any time though, as indicated later, it is preferred to make the addition prior to imination.

A particularly preferred method of accomplishing the polymerization in the preparation of the present dispersions comprises initially batch polymerizing, under ethylene pressure, about 3–20 percent by weight of the total vinyl ester to be copolymerized followed by the continuous addition and polymerization of the remaining monomers. The initial polymerization is carried out in an aqueous medium containing, based on the total amount present in the final dispersion, about 40–80 percent of the water, about 15–30 percent of the surfactants, about 0.5–20 percent of the protective colloid, and 50–100 percent of the catalyst. After polymerization of the initial batch, the remaining quantities of the ingredients, including all of the acid monomer, are continuously or intermittently metered into the reaction vessel at a rate such that the monomer build-up in the vessel at any given time, based on the reaction mixture (water, copolymer, etc.) does not exceed about 12 weight percent.

The carboxylic copolymer is produced in any molecular weight that is desired. Usually the molecular weight is above 100,000 for polymers used as binders in paint formulations, but even molecular weights of about a million and above are frequently used. As usually prepared, copolymers have inherent viscosities of 0.4–2 deciliters/gram. Inherent viscosity is measured as follows: A sample of the dispersion is obtained which contains 0.5 gram of solid. The aqueous component of the sample is then adjusted until 1.0 gram of water is present followed by the addition of acetone to give 100 ml. of solution. Subsequently, the inherent viscosity is measured at 25° C. by known techniques. Similarly, while copolymer particle sizes can be as high as 2 microns, it is desirable to have the predominant number of particles in the range of 0.1–.5 micron and, preferably, less than 0.3–0.4 micron. In general, the dispersions can be prepared with solids levels of 10 to upwards of 60 percent.

In addition to the above-mentioned ingredients, it is also frequently desirable to carry out the polymerization in the presence of a basic compound which acts as a buffer. As illustrated in U.S. Pat. 3,271,373, coagulum formulation during polymerization can frequently be reduced by neutralizing about 5–70 percent of the acid groups present in the polymer with a suitable base. Regarding the polymerization initiators, any of the free radical type initiators commonly used in emulsion polymerization can be employed. Among others, these include persulfates, perborates, peroxides, and azonitriles. The oxidizing initiators can be used in conjunction with reducing agents, such as sodium metabisulfite, sodium formaldehyde sulfoxylate, etc.

After polymerization, the carboxylic coplymer is iminated by being reacted with an aziridine compound. Preferably the addition of the potassium tripolyphosphate is made prior to imination. When the addition is made after imination, it has been noted that, on imination, the dispersions tend to thicken undesirably, thus necessitating long imination times. On the other hand, when the potassium tripolyphosphate is added to the dispersion during polymerization, suitable viscosities are obtained after comparatively short imination times. The aziridine compound, used for imination, is commonly referred to as an alkylene imine and has the formula:

Formula A

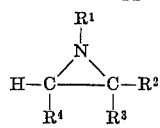

wherein:

R¹ is hydrogen, benzyl or a $C_1$ to $C_5$ alkyl radical, and is preferably hydrogen or a $C_1$ to $C_4$ alkyl radical;

R² and R³ are selected individually from the group consisting of hydrogens, benzyl, aryl and $C_1$ to $C_5$ alkyl radicals; and R⁴ is hydrogen or a $C_1$ to $C_5$ alkyl radical.

Ethylenimine (Formula B) and propylenimine (Formula C) are particularly preferred aziridines, because of their relatively low cost and plentiful supply.

Formula B      Formula C

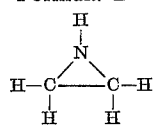 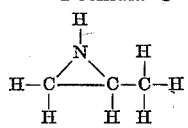

The aziridine compound is added to the carboxylic copolymer emulsion in an amount sufficient to iminate about 5–55 percent, and preferably 20–40 percent, of the acid groups. The degree of imination is established by measuring the disappearance of the acid functionality by titration before and after imination. Titration is carried out in a pyridine solution using a methanol solution of tetrabutylammonium hydroxide with thymol blue as an indicator. Imination is accomplished by adding the aziridine compound to the emulsion in an amount equal to about 10–200 percent, preferably 60–150 percent, of the theoretical stoichiometric amount required to react with all of the pendant carboxyl groups (assuming one aziridine molecule reacts with one carboxyl group.) Generally, about 30 percent imination is obtained by the addition of the aziridine compound in about the theoretical stoichiometric amount required for complete imination. What exactly occurs when the aziridine compound is added to the emulsion is not completely understood; however, among others, at least some of the following reactions are thought to take place: reaction of the aziridine compound with a carboxyl group to yield amino esters; rearrangement of amino esters to hydroxyamides; multiple addition of the aziridine compound to the amino ester to form polyamine side chains; hydrolysis of the aziridine compound; aziridine homopolymerization; and reactions between amine groups and acetate groups.

As illustrated in U.S. Pats. 3,261,796, 3,261,797, 3,261,799 and 3,282,879, typical procedures for carrying out the imination reaction simply comprise mixing the aziridine compound with the carboxylic copolymer dispersions. Preferably, the mixture is reacted at about 40–75° C. until the added aziridine is essentially consumed (e.g., about ½ hour at the higher temperature to about 12 hours at the lower temperature), and finally the reaction product is cooled to room temperature. The entire reaction can be carried out at room temperature, but heating is generally preferred because of the shorter reaction time.

In general, aqueous paints prepared from the dispersion of the present invention have a pH of about 7–10. Consequently, dispersions having a pH between about 6 and 9 and, preferably, 7 and 8, are ordinarily prepared in the present invention.

To prepare a paint formulation, any of the ordinary water-insoluble inorganic and organic paint pigments well known in the art can be mixed with the present iminated dispersions. However, the relative amount and type of pigment in the formulation has an effect on the properties of the paint. A pigment volume concentration of about 10 percent is about the minimum proportion of pigment which will provide a paint which has a practical hiding power. The maximum proportion of pigment corresponds to a pigment volume concentration of about 70 percent. Preferably, however, a pigment volume concentration in the range of 25–65 percent is desirable. Pigment volume concentration is the ratio expressed on a percent basis of the volume of pigment to the total volume of pigment plus film-forming materials of the compositions; the volume of pigment is the volume of vehicle displaced by the pigment wet with vehicle.

The following example illustrates the present invention. All parts and percentages are by weight unless otherwise indicated.

Example I

A stainless steel autoclave equipped with agitator, two liquid and one gas feed lines, temperature and pressure sensing and recording devices and a water-filled jacket for cooling and heating was purged with nitrogen and then with ethylene. An initial charge, the composition of which is indicated in Table 1, was added in two streams, one consisting of vinyl acetate and the other of the remaining ingredients as an aqueous solution. The agitator was started and the reactor pressured with ethylene to 270 p.s.i.g. The temperature was then raised to 75° C. over a 20-minute period. Subsequently, the ethylene pressure was raised to 400 p.s.i.g. and the continuous feeds, the compositions of which are indicated in Table 1, were started. During the continuous feed period of two hours the temperature was held at 75±1° C. and the pressure at 400 p.s.i.g. Ten minutes after the end of the continuous feed period, the temperature was raised to 90° C. over a 30-minute period with the pressure at 400 p.s.i.g. and then was held at 90° C. for 15 minutes. The reaction mixture was then discharged into a receiving vessel which was vented to the atmosphere.

TABLE 1

|  | Initial charge, parts | Continuous feeds, parts | |
| --- | --- | --- | --- |
|  |  | Aqueous [1] | Organic [2] |
| Anionic surfactant [3] | 0.84 | 3.35 |  |
| Nonionic surfactant [4] | .44 | 1.77 |  |
| Potassium tripolyphosphate | .078 | .26 |  |
| Sodium tetraborate pentahydrate (bactericide promoter) | .021 | .083 |  |
| Hydroxyethylcellulose [5] | .073 | .293 |  |
| Potassium bicarbonate | .044 | .177 |  |
| Ammonium persulfate | .27 | .09 |  |
| Water | 38.57 | 18.30 |  |
| Vinyl acetate | 3.2 |  | 59.9 |
| Acrylic acid |  |  | 1.25 |

[1] At a constant rate of 0.20 part/min.
[2] At a constant rate of 0.51 part/min.
[3] "Aerosol" A-102-disodium salt of half ester of sulfosuccinic acid-derived from straight chain ethoxylated alcohol mixture.
[4] "Triton" X-100-octylphenylpolyether alcohol, 9-10 ethylene oxide groups per molecule.
[5] "Natrosol" 300L, deg. of substitution=3.0; Brookfield viscosity of 5% aqueous solution at 25° C.=75-150 cp.

The dispersion had a solids content of 57.9%, a pH of 5.2, a Brookfield viscosity of 210 cp. at 25° C., and a residual vinyl acetate monomer content of 0.65. The composition of the polymer, by weight, was 86.1% vinyl acetate, 12.2% ethylene and 1.7% acrylic acid with a predominant copolymer particle size of less than 0.3–0.4 micron and an inherent viscosity of 0.75 dl./g.

To 30 parts of the dispersion at 70° C. was added 0.54 part of a 33% aqueous solution of ethylenimine (about 100 percent of the theoretical stoichiometric amount) over a period of 10 minutes with agitation. Stirring was continued at 70° C. for 30 minutes. The dispersion was then cooled to 25° C. and 0.015 part of a 4% aqueous solution of sodium "Omadine," as a bactericide, was added with agitation.

The resulting dispersion, in which about 30–35 percent of the acid groups were iminated, had a solids content of 57.2%, a pH of 7.8, and a Brookfield viscosity of 400 cp.

The dispersion of Example I was tested for formulating latitude by combining it with a wide variety of different pigment grinds useful for preparing exterior white top coat paint, and then subjecting the paints to an accelerated stability test at 140° F. for two weeks. The viscosity (Krebs) of the paint was measured before and after the stability test using a "Krebs Stormer Viscometer." None of the paints tested showed a change in Kreb units of more than 10; which is indicative of good formulating latitude of the basic dispersion. Comparatively, similar paints formulated from dispersions other than that of Example I, exhibited no consistent pattern with respect to the stability test and, thus, did not have good formulating latitude.

What is claimed is:
1. An aqueous medium having dispersed therein:
   (I) a copolymer which is the reaction product of:
      (a) a carboxylic vinyl ester/ethylene copolymer, having 5–55 percent of the acid groups iminated, and containing 80–95 weight percent copolymerized vinyl ester, 1–18 weight percent copolymerized ethylene and, prior to imination, 0.01–1.0 milliequivalent of acid per gram of copolymer; and
      (b) an alkylene imine compound of the formula:

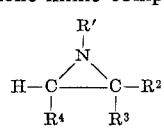

wherein $R^1$, $R^2$, and $R^3$ are selected individually from the group consisting of hydrogen, benzyl, and $C^1$ to $C^5$ alkyl radicals; and $R^4$ is hydrogen or a $C^1$ to $C^5$ alkyl radical;
   (II) an anionic/non-ionic surfactant combination of, based on the copolymer weight, 0.5–3.5 percent anionic surfactant (a) and 1–5 percent non-ionic surfactant (b), wherein (a) is a di-sodium or di-potassium salt of the half ester of sulfosuccinic acid derived from a $C_{10}$–$C_{12}$ straight chain ethoxylated alcohol mixture and (b) is a $C_7$–$C_{10}$ alkylphenol polyether alcohol with 8–15 ethylene oxide groups per molecule;
   (III) at least 0.2 percent, based on the copolymer weight, of potassium tripolyphosphate; and
   (IV) at least 0.2 percent, based on the copolymer weight, of a water-soluble protective colloid selected from the group consisting of methyl cellulose, hydroxyethyl cellulose, and polyvinyl alcohols.

2. The dispersion of claim 1 wherein the vinyl ester is vinyl acetate.

3. The dispersion of claim 2 wherein the acid in the copolymer is supplied by copolymerized acrylic or methacrylic acid which is present in the copolymer in an amount of 0.5–10 percent, based on the copolymer weight.

4. The dispersion of claim 3 wherein 20–40 percent of the acid groups are iminated and wherein the copolymer contains 83–92 weight percent copolymerized vinyl acetate, 7–16 weight percent copolymerized ethylene, and 0.7–4 weight percent copolymerized acrylic or methacrylic acid.

5. The dispersion of claim 4 wherein, based on the copolymer weight, the surfactant combination has 1.5–2.5 percent anionic surfactant (a) and 2–4 percent non-ionic surfactant (b).

6. The dispersion of claim 4 wherein potassium tripolyphosphate and the protective colloid are present in amounts of 0.35–1 percent and 0.3–1 percent, respectively, both being based on the copolymer weight.

7. The dispersion of claim 6 wherein, based on the copolymer weight, the surfactant combination has 1.5–2.5 percent anionic surfactant (a) and 2–4 percent non-ionic surfactant (b).

8. The dispersion of claim 7 wherein the anionic surfactant is the di-sodium salt and the non-ionic surfactant is a $C_8$–$C_9$ alkylphenyl polyether alcohol having 9–13 ethylene oxide groups per molecule.

9. The dispersion of claim 8 wherein the acid in the copolymer is acrylic acid and the copolymer is iminated with ethylenimine.

10. The dispersion of claim 1 having a pigment additionally dispersed therein.

References Cited

UNITED STATES PATENTS 3,261,797   7/1966   McDowell et al. _____ 260—29.6

WILLIAM H. SHORT, Primary Examiner

L. M. PHYNES, Assistant Examiner

U.S. Cl. X.R.

260—29.6, 41, 87.3